(No Model.)
A. G. WATERHOUSE.
ELECTRIC CURRENT REGULATOR.
No. 518,359. Patented Apr. 17, 1894.
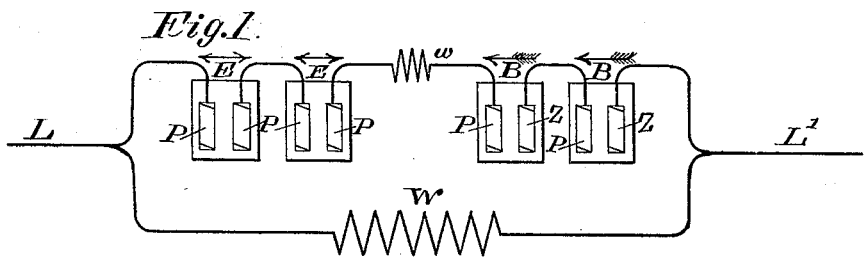
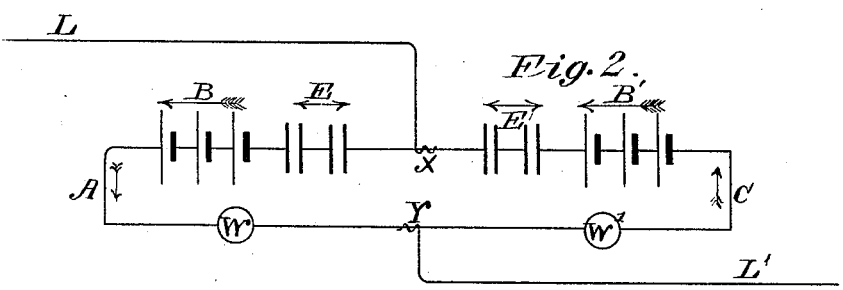
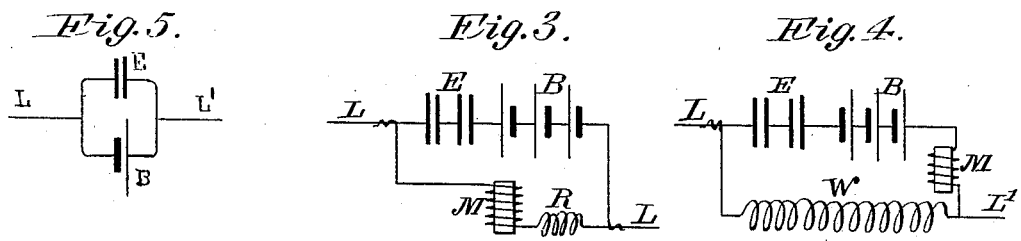
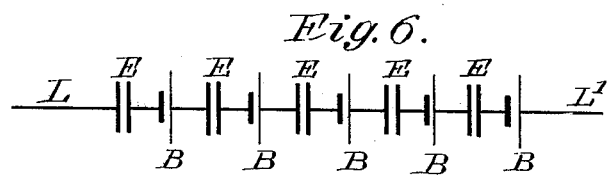
Witnesses
Charles B. H. olcott.
Albert E. Chappel
Inventor
Addison G. Waterhouse
THE NATIONAL LITHOGRAPHING COMPANY,
WASHINGTON, D. C.

UNITED STATES PATENT OFFICE.

ADDISON G. WATERHOUSE, OF HARTFORD, CONNECTICUT, ASSIGNOR TO THE WATERHOUSE ELECTRIC COMPANY, OF CONNECTICUT.

ELECTRIC-CURRENT REGULATOR.

SPECIFICATION forming part of Letters Patent No. 518,359, dated April 17, 1894.

Application filed November 26, 1892. Serial No. 453,191. (No model.)

*To all whom it may concern:*

Be it known that I, ADDISON G. WATERHOUSE, a citizen of the United States, residing at the city of Hartford, in the State of Connecticut, have invented new and useful Improvements in Electric-Current Regulators, of which the following is a specification, reference being had to the accompanying drawings, making a part thereof.

My invention relates generally to improvements upon a former invention, for which I applied for Letters Patent April 13, 1892, bearing Serial No. 429,009; and comprises the improvements hereinafter described.

My present invention also relates to the manner in which I combine electrolytic cells with primary batteries and to the uses of such cells and batteries for the purposes of regulating electric currents, as will be hereinafter described by reference to the accompanying drawings, in which—

Figure 1, shows a set of electrolytic cells arranged in series with a set of primary batteries, placed in a circuit forming a shunt around part of a main circuit. Fig. 2, shows a diagram of a divided circuit adapted for an alternating current, with a combination of electrolytic cells and primary batteries in each branch. Fig. 3, shows a divided circuit having a combination of cells and batteries in one branch of its circuit and electromagnets and resistances representing work in the other. Fig. 4, shows a divided circuit with cells, batteries and work in one branch, and a resistance representing work in the other. Fig. 5, shows a divided circuit with an electrolytic cell in one branch and a primary battery in the other. Fig. 6, shows part of an electric circuit with a series of electrolytic cells and primary batteries arranged thereon.

Before proceeding with this specification, I will define the meaning of electrolytic cell and primary battery, as far as relates to their nature and uses in connection with my invention. An electrolytic cell is a combination of two electrodes immersed in a fluid conductor, called an electrolyte which permits a current to pass through it from one electrode to the other only by means of the decomposition of the electrolyte into ions,— that is, a current cannot pass through the electrolyte unless it has an electromotive force or E. M. F. sufficient to perform the work of decomposing the electrolyte, and a current having an electromotive force less than that required to perform such work cannot pass through such electrolyte and this opposition which an electrolyte offers to the passage of a current assumes the nature of a counter electromotive force of a fixed standard or unit of opposing force, and it is this force which opposes the passage of a current that I make use of in my invention, and will designate it as the electrolytic counter force as E. C. F., which we will assume to be equal to 1.5 volts offered by each electrolyte through which a current is made to pass. This electrolytic counter force is comparatively constant while the resistance offered by an electrolytic cell may vary with the material used as an electrolyte and the size, separation and specific resistance of the material used for electrodes, which resistance in this case I reduce to a minimum or to so small a factor as to be able to disregard it as far as relates to this case. The difference between an electrolytic cell and a primary battery is that the former is able to offer a counter electromotive force to the passage of a current through it, while at the same time, it is unable within itself to create or maintain a current, although it is capable of producing a secondary current in a reverse direction to that in which a current passes through the cell, such current being due to "the accumulation of different substances on the two electrodes" would be of short duration and not interfere with the purposes of this invention, especially when reduced to a minimum by the use of non-attackable electrodes, such as for example platinum or carbon. A further feature of an electrolytic cell is that it offers a counter electromotive force to a current passing through it in either direction, while the primary battery offers a counter electromotive force to the passage of a current in only one direction and adds its current producing capacity to a current passing through it in a direction which corresponds to the direction of the current which the battery itself is capable of creating and maintaining. In this case, the battery shown and spoken of as a primary battery is meant to embrace any form of current producing generator, including dynamo-electric machines, thermo electric, or electro chemical, including gas and storage batteries which are capable of producing a current in one direction and offering a counter electromotive force to a current passing through them in a direction opposite to their own current. So with the above explanation in view, I will proceed with the specification, referring to the electrolytic cell and primary battery, with their differences as described, in view.

Fig. 1 shows a way of using electrolytic cells E in connection with primary batteries B, by placing them both in series upon a branch circuit $w$, while the other branch W may represent a working or other form of resistance. When a current passes from L to L' it will naturally divide, but if the electromotive force between L and L' is less than the combined counter electromotive force of both cells E and batteries B, then no current passes through the branch $w$, but all passes through branch W, still at the same time the dead resistance of W may be much greater than that of $w$, but when the current increases so that the voltage between L and L' rises above the counter electromotive force of cells E and batteries B, then part of the excess of current would pass by way of $w$ and if the dead resistance of $w$ was made very small and that of W comparatively great, then practically, all the excess of current would pass by $w$, while the current up to a certain standard or below would all pass through the branch W. Now in this arrangement, if all the cells placed on branch $w$ were current producing batteries, then in case the current from L to L' should stop, they would set up a local current in the circuit L, $w$, L', W, formed by the two branches $w$ and W meeting, and in such case would expend their energy and destroy their use; so to prevent this result or defect, I combine a certain number of electrolytic cells E with a number of batteries B, and proportion them so that when no current is passing from L to L', then the current which the batteries would tend to set up will be checked by the counter electromotive force offered by the cells E, while at the same time the cells E would join their counter electromotive force with the batteries B in the opposite direction in opposing a current from L to L'.

Fig. 2 shows a diagram representing part of a circuit L, L', divided in two branches A and C, each branch having thereon a set of cells E and batteries B; the direction of polarity or current which the batteries would tend to set up, if not checked by the counter electromotive force of the cells E, would be as indicated by arrows; therefore, the counter electromotive force which the batteries B would offer would be in one, or the direction shown by arrows, while the cells E would offer a counter electromotive force in both directions; therefore it is plain that if a current passed in the direction from L to L', it would pass around by the way of A, while a current passing from L' to L would pass around by way of C, and therefore, if an alternating current should pass on the line L L', the impulse from L to L', would pass by way of A in the direction shown by arrow, and the impulse from L' to L would pass by way of C, in the direction shown by arrow, and these two currents would produce in the circuit formed by the two branches A and C, a one way current of an intermittent nature in a direction from $x$ through A, W, Y, W', C, and back to $x$, which would give practically a direct current through what would represent the work W and W' from a source of energy transmitted by an alternating current on the line L, L'.

I am aware that alternating currents have been converted into direct currents in a local circuit formed by two branches of the main, by using the counter electromotive force of current producing batteries, but the means have been impracticable for the reason that when the alternating current ceased, these batteries would set up a local current in the circuit formed by the two branches into which they were placed, and this would exhaust or destroy them; and in order to prevent this objection, I combine the electrolytic cells E with the batteries B to overcome this defect, and obtain practical results.

Figs. 3 and 4, show diagrams similar to Fig. 1. In Fig. 3, is shown the cells E and batteries B in one branch of a circuit and work M and R in the other, while Fig. 4, shows the cells E and batteries B, together with work M in one branch and work W in the other. The work M, in these figures is shown as an electro magnet which when a current flows through it alters the electrical conditions of either or both of the circuits. For instance the electro-magnet may be the field magnet or armature of a dynamo or motor or may simply be the magnet of an electro-magnetic key or switch or the like. Such devices are described in the specification of my United States application, Serial No. 429,009, filed on or about April 13, 1892, and need not be further described herein.

Fig. 5, shows a diagram in which the cells E are in one branch of a circuit, while the batteries B are in the other. This arrangement would cause the batteries B to offer a counter electromotive force to a current passing through its branch in one way and assist a current in the other, while the cells E would offer a counter electromotive force to a current through its branch from either way, and the two would still be combined in the local circuit formed by the two branches so that the counter electromotive force of the cells E would check the current producing force of the batteries. Of course, work could be placed in either or both branches of this circuit.

Fig. 6, shows how the cells E and batteries

B can be combined in a circuit by alternating them, or placing them in any other order, but it must be borne in mind that the number of batteries and cells are to be so proportioned as to cause one to counteract or predominate over the other, in a way adapted to the uses or requirements which may be met.

I can very readily vary the electromotive force or counter electromotive force, existing in the circuit by short circuiting one or more of the electrolytic cells, thus altering the proportion of the number of batteries to the number of electrolytic cells. This short circuiting will not in any way injure the electrolytic cells but it is obvious that such procedure would be very harmful for primary batteries.

I would have it understood that in place of the cells E, any form of electrolytic piles or arrangement of electrolytic elements may be used.

What I claim as my invention is—

1. In the local circuit formed by dividing an electric circuit into two closed circuit branches, the combination of one or more electrolytic cells with one or more current generators, the counter electro-motive force of the cells being approximately equal to the electromotive force of the generators, substantially as and for the purposes specified.

2. In the local circuit formed by dividing an electric circuit into two branches, the combination of electrolytic cells with current generators in both branches, in such proportions that the counter electro-motive force of the cells is approximately equal to the electromotive force of the generators in the local circuit, substantially as and for the purposes specified.

3. In an electric circuit divided into two branches, electrolytic cells having non-attackable electrodes in combination with current generators having their poles arranged in the branches respectively, as described, so that if a current be flowing in the circuit in one direction the generators assist the electrolytic cells in opposing the current in one branch but assist the current in overcoming the counter electro-motive force of the cells in the other branch, substantially as and for the purpose specified.

4. The combination with a branched electric circuit, of an electrolytic cell or cells having non-attackable electrodes in a branch,—and a current generator, said current generator and electrolytic cell or cells being in series with one another on the local circuit formed by said branches, as and for the purpose described.

5. The herein described method of converting alternating currents into currents of the same direction, consisting in opposing the alternating currents by a current generator in a branch of the circuit, and balancing said current generator by the counter electro-motive force of an electrolytic cell or element.

6. The herein described method of converting alternating into direct currents, consisting in opposing the flow of current of one sign and assisting the flow of current of the other sign in each of two branches by current generators, and opposing the flow of current from said generators on short circuit by the counter electro-motive force of an electrolytic element or elements.

7. The herein described method of regulating an electric current, consisting in opposing the flow thereof in either of two branches of a circuit by a current generator, and opposing the flow of current from said generator on short circuit through said branches by the counter electro-motive force of an electrolytic element or elements.

8. The herein described method of regulating the flow of alternating currents, consisting in establishing two branches of circuit, opposing the flow of currents of one sign and assisting the flow of currents of the other sign by a current generator in a branch of said circuit and balancing the current of said generator on short circuit through the branches by the counter electro-motive force of an electrolytic element.

ADDISON G. WATERHOUSE.

Witnesses:
   CHARLES B. WOLCOTT,
   ALBERT E. CHAPPEL.